United States Patent [19]

Yasunaga et al.

[11] Patent Number: 4,935,605

[45] Date of Patent: Jun. 19, 1990

[54] APPARATUS FOR CORRECTING CURL OF MAGNETIC RECORDING MEDIUM

[75] Inventors: Tadashi Yasunaga; Masaru Sekine, both of Kanagawa, Japan

[73] Assignee: Fuji Photo Film Co., Ltd., Kanagawa, Japan

[21] Appl. No.: 278,407

[22] Filed: Dec. 1, 1988

[30] Foreign Application Priority Data

Dec. 4, 1987 [JP] Japan .................................. 62-307186

[51] Int. Cl.$^5$ ............................................ B65H 23/34
[52] U.S. Cl. .................................... 219/469; 219/216; 162/197; 162/271
[58] Field of Search ........................ 219/216, 469–471; 355/311; 162/197, 270, 271

[56] References Cited

U.S. PATENT DOCUMENTS

| | | | |
|---|---|---|---|
| 2,893,053 | 7/1959 | Powell | 162/270 |
| 3,012,301 | 12/1961 | Rogers | 162/270 |
| 4,013,363 | 3/1977 | Putnam | 355/97 |
| 4,202,723 | 5/1980 | Chaudhuri | 156/555 |
| 4,567,349 | 1/1986 | Henry | 219/216 |

Primary Examiner—Teresa J. Walberg
Attorney, Agent, or Firm—Sughrue, Mion, Zinn, Macpeak & Seas

[57] ABSTRACT

An apparatus for correcting curl of a belt-like magnetic recording medium made of a ferromagnetic thin film formed on a flexible substrate, in which the magnetic recording medium fed from a master roll thereof contacts a heating roller so that curl of the magnetic recording medium is corrected. The surface of the heating roller is covered with a material having thermal conductivity lower than that of a material forming the body of the heating roller.

11 Claims, 1 Drawing Sheet

APPARATUS FOR CORRECTING CURL OF MAGNETIC RECORDING MEDIUM

BACKGROUND OF THE INVENTION

1. Field of the Invention

The present invention generally relates to an improvement of an apparatus for producing a magnetic recording medium, and particularly relates to an apparatus for correcting curling of a magnetic recording medium composed of a ferromagnetic thin film formed on a flexible substrate.

2. Prior Art and Problems Thereof

A so-called thin film magnetic recording medium in which a ferromagnetic thin film is formed on a substrate through vacuum evaporation, ion plating, sputtering, or the like, has received much attention as a medium having high recording density. The practical applications of such a thin film magnetic recording medium has likewise been earnestly investigated. A flexible substrate mainly composed of a plastic base, for example, of polyethylene terephthalate, polyimide, polyamide, or the like, has been widely used as the substrate of the thin film magnetic recording medium because of their various advantages in practical use.

In the case where such a plastic flexible substrate is to be used for in the thin film medium, however, when a ferromagnetic thin film is formed on the substrate, for example, through vacuum evaporation, the surface of the substrate is heated to a considerably high temperature by radiant heat from an evaporation source, heat of evaporated atoms, and so on. As a result strong internal stress is generated in the ferromagnetic thin film causing the resulting thin film recording medium to curl severely. This curl remains even after the recording medium is slit to obtain tape-like media, resulting in the following problems.

First, proper contact between a magnetic head and the tape-like recording medium cannot be maintained so that faithful recording/reproducing cannot be performed.

Secondly, the tape-like recording medium cannot run smoothly in a tape deck.

Third, disturbance is caused during the winding of the tape-like recording medium so that the tape-like recording medium is damaged at its edge portions.

In order to eliminate the foregoing problems, a method has been proposed in which the substrate is made to undergo transformation in order to correct the curl of the magnetic recording medium. Such a conventional curl correcting method is disclosed in Japanese Patent Unexamined Publication No. 58-158027 in which the curl of a magnetic recording medium composed of a ferromagnetic thin film formed on a polyester film is corrected by making the magnetic recording medium come into contact with a heating member such as a heating roller or the like, with predetermined amount of tension at a predetermined temperature for predetermined time. In this method, however, cracks may be caused in the ferromagnetic thin film. These cracks are most probably the result of a thermal shock caused by the heating roller. The electromagnetic conversion characteristics are reduced or the amount of loss of the products is increased, as a result of these cracks.

Further, Japanese Patent Unexamined Publications Nos. 57-167136, 57-167137 and 57-167138 disclose a method for moderating the foregoing thermal shock, in which the temperature of a medium is raised at a predetermined rate to generate thermal shrinkage in the medium with a predetermined tension on the medium. Then the medium which has been subjected to heat shrinkage is cooled with a temperature descending gradient corresponding to the foregoing temperature ascending gradient. In this method, however, there have been problems in that it is necessary to correctly control the temperature along a predetermined temperature changing pattern, and the accommodation space and apparatus for performing heating and cooling is large scaled, the operation is complicated, and a relatively long time is required for treatment.

SUMMARY OF THE INVENTION

It is therefore an object of the present invention to eliminate the foregoing defects in the prior art and to provide an apparatus which has an extremely compact structure and which is capable of effectively correcting for curl of a thin film magnetic recording medium in a short period of time.

The object of the present invention can be attained by an apparatus for correcting curl of a belt-like magnetic recording medium composed of a ferromagnetic thin film formed on a flexible substrate, in which the magnetic recording medium fed from a master roll thereof is made to come into contact with a heating roller so that curl of the magnetic recording medium is corrected. The surface of the heating roller is covered with a material having thermal conductivity lower than that of a material forming the body of the heating roller.

An embodiment of the apparatus according to the present invention will be described hereunder with reference to the accompanying drawings.

DETAILED DESCRIPTION OF THE PREFERRED EMBODIMENTS

Figure 1:
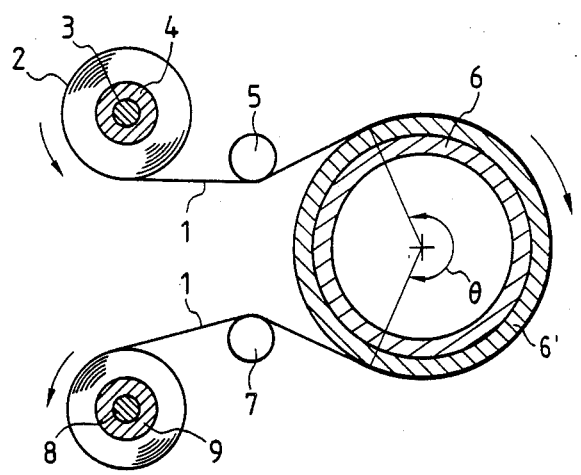
FIG. 1 is a side view showing the curl correcting apparatus according to the present invention.

In FIG. 1, a master roll 2 of a belt-like magnetic recording medium 1 is wound on a winding core 4 with the ferromagnetic thin film side facing the winding core 4. The winding core 4 is mounted on a feeding shaft 3. The magnetic recording medium 1 is wound around a heating roller 6 through a feeding guide roll 5 and then taken up by a winding core 9 through a winding guide roll 7. The winding core 9 is mounted on a winding shaft 8. The heating roller 6 has a hollow cylindrical body having heating equipment such as a resistor type heater, a dielectric heating coil, a heating pipe, or the like, in the interior.

The surface of the body of the heating roller 6 is covered with a material 6 having thermal conductivity lower than the material which forms the body. The material forming the body of the heating roller 6 is selected from metal materials such as aluminum, stainless steel, and the like and the material 6 covering the body surface of the heating roller 6 is selected from various plastic material such as, for example, polyethylene fluoride, polyimide, alumina, and silicon nitride, or from ceramic materials. The coating over the surface of the heating roller 6 is applied by thermal spraying with the foregoing material or fitting the foregoing material.

The surface is then finished through grinding or the like so that it is smooth. The desirable thickness of the coverage layer is 10 μm to 1 mm, since sufficient curl correction cannot be performed if the covering layer is too thick or too thin. The heating roller 6 is heated in advance, and when the surface temperature of the roller has reached a predetermined value, the magnetic recording medium 1 is wound around the heating roller 6 so that the rear surface of the medium 1, that is, the substrate surface on the nonmagnetic layer side, comes directly into contact with the heating roller 6. In the case where the flexible substrate of the magnetic recording medium 1 is made of a plastic material, the surface temperature of the heating roller 6 must be higher than at least a glass transition point (Tg) of the plastic material. If the surface temperature is not higher than the glass transition point (Tg), curl of the magnetic recording medium 1 cannot be sufficiently corrected even though the treating time may be prolonged.

It is a matter of course that the curl correction effect of the apparatus according to the present invention is considerably influenced by the treating time and the surface temperature of the heating roller 6. The foregoing factors are relevant to each other. Although the optimum condition cannot be generally determined, the treating time necessary to correct the curl is sufficient if it is set to 0.5 seconds when the surface temperature of the heating roller 6 is 180 °C. in the case where the substrate is made of polyethylene terephthalate. The term "treating time" used herein means the time during which the magnetic recording medium 1 is in contact with the heating roller 6, and is determined by the feeding speed of the magnetic recording medium 1, the outer diameter of the heating roller 6, and the angle θ (FIG. 1) at which the magnetic recording medium 1 is wound around the heating roller 6.

The tension applied to the magnetic recording medium 1 should not be smaller than 1 kg(wt) per width of 100 mm. Further, the winding angle of ,the magnetic recording medium 1 around the heating roller 6 should be set to a value within a range of from 90° to 350°.

The outer diameter of the heating roller 6 is sufficient if it is within a range of from 100 mm to 2000 mm. If the outer diameter is too small, cupping in the feeding direction of the magnetic recording medium 1 is apt to be generated. On the other hand, if the outer diameter is too large the size of the apparatus becomes much larger and it becomes difficult to control the temperature and the conveyance of the magnetic recording medium 1. It is necessary to select the thickness of the heating roller 6 to be a value within a range of from 2 to 200 mm in order to maintain sufficient strength thereof.

The thickness of the flexible substrate of the magnetic recording medium 1 is usually selected to be within a range of from 5 to 50 μm, and the ferromagnetic thin film usually having a thickness within a range of from 500 to 3,000 Å is formed on the substrate through vacuum evaporation, sputtering, ion plating, or the like. The flexible substrate is made from a plastic film such as polyethylene terephthalate, polyimide, polyamide, polycarbonate, polyvinyl chloride, or the like. The ferromagnetic thin film is made of a metal such as Fe, Co, or Ni, alloy thereof, or a compound such as iron nitride or the like.

In the apparatus according to the present invention, since the surface of a conventional heating roller body is coated with a material having thermal conductivity lower than that of the heating roller body, cracks which may cause reduction of electromagnetic conversion characteristics of the magnetic recording medium can be prevented from occurring in the ferromagnetic thin film and curl of the magnetic recording medium can be quickly and efficiently corrected by using an extremely compact apparatus.

The foregoing novel effects of the apparatus according to the present invention will be made more clear by an example of the embodiment hereunder.

EXAMPLE

Figure 2:
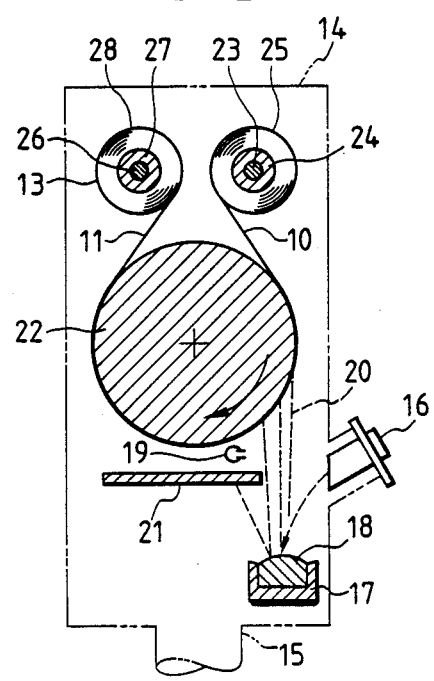
FIG. 2 is a side view showing an apparatus for forming a ferromagnetic thin film of a magnetic recording medium.

A master roll 13 of a magnetic recording medium 11 in which a ferromagnetic thin film of an alloy of Co and Ni was formed on a substrate 10 of polyethylene terephthalate having a thickness of 12 μm and a width of 100 mm was formed by using a winding-up type evaporation apparatus as shown in FIG. 2.

That is, a vacuum tank 14 was exhausted through an exhaust opening 15 so as to reduce the inside pressure to and create a vacuum not larger than $5 \times 10^{-5}$ Torr. Then a raw metal material 18 for a ferromagnetic thin film having a composition of $Co_{80}Ni_{20}$ disposed in a magnesia crucible 17 was heated so that it evaporated by means of a Pierce electron gun 16. At the same time, an oxygen gas was led into the vacuum tank through a gas inlet 19 so that the vacuum became $3 \times 10^{-4}$ Torr. An evaporation atom flow 20 of the heat-evaporated metal was passed by an adhesion preventing plate 21 used for oblique incidence so as to be obliquely deposited on the substrate 10 positioned on a cooling can 22. The substrate 10 was fed from a substrate master roll 25 wound on a winding core 24 mounted on a feeding shaft 23, and conveyed while being in contact with the cooling can 22 so that the substrate 10 wa subject to oblique evaporation thus forming the magnetic recording medium 11. Then, the magnetic recording medium 11 was taken up by a winding core 27 mounted on a winding shaft 26 to thereby obtain a master roll 28 of the magnetic recording medium 11. The thickness of the thin magnetic layer formed on the substrate 10 was 2,000 Å.

The master roll 28 of the magnetic recording medium 11 thus obtained was treated by means of the curl correction apparatus of FIG. 1.

The magnetic recording medium 11 was wound around the heating roller 6 and fed at a fixed speed of 10 m/min with the ferromagnetic thin film of the recording medium facing outwards. The heating roller 6 was made of aluminum having an outer diameter of 200 mm and was provided with a coating layer formed uniformly on its surface. The coating layer 6 had a thickness of 30 μm and was formed of polyethylene fluoride (TEFLON: trademark, produced by Du Pont (E. I.) de Nemours & Co.). Further, another heating roller of aluminum having no coating layer was prepared for comparison purposes.

The surface temperature of the heating roller 6 was varied. A terminal of a contact type thermometer was pressed against the surface of the heating roller 6 to measure the surface temperature. The winding angle of the magnetic recording medium 11 around the heating roller 6 was 250°.

The curl value of the magnetic recording medium 11 treated by the curl correction apparatus as described above and cracks in the ferromagnetic thin film of the magnetic recording medium 11 were evaluated.

The magnetic recording medium 11 was cut transversely (in the direction perpendicular to the feeding direction) into strip-like samples each having a width of 3 cm and a length of 10 cm.

Each of the samples was stood on a horizontal plate with its edge (the side of the 10 cm length) downside, and the radius of curvature R(cm) at that time was read to thereby obtain the curl value $10/R(cm^{-1})$.

Cracks in the ferromagnetic thin film were observed through a differential interference microscope (100 magnifications).

Table 1 shows the results of the test.

In the samples 2, 3 and 4 in the case where no coating layer of Teflon was formed on the heating roller surface, it was found that while curl could be corrected at 110° C. and 130° cracks occurred, and it was not possible to correct the curl while preventing the occurrence of cracks at 90° C.

On the other hand, in samples 5, 6 and 7 in the case where a coating layer of Teflon was formed on the heating roller surface, curl could be corrected at 110° C. and 130° C. while curl could not be corrected at 90° C., and no cracks occurred in the ferromagnetic thin film in any of the samples.

TABLE 1

| Sample Number | Surface Temperature of heating Roller | Curl Value* | Crack** | Heating Roller |
|---|---|---|---|---|
| 1 | Not treated | 10 | O | — |
| 2 | 90° C. | 12 | O | Having no coating layer |
| 3 | 110° C. | 4 | ≡ | |
| 4 | 130° C. | 0 | X | |
| 5 | 90°99 C. | 13 | O | Having coating layer |
| 6 | 110° C. | 5 | O | |
| 7 | 130° C. | 0 | O | |

*Curl value: $10/R$ $(cm^{-1})$ (R: radius of curvature)
**O: No crack
≡: Some cracks
X: Many cracks

What is claimed is:

1. An apparatus for correcting curl without cracking of a belt-like magnetic recording medium composed of a ferromagnetic thin film formed on a flexible substrate comprising:
    a master roll from which a magnetic recording medium is fed; and
    a heating roller on which said magnetic recording medium is disposed for correcting curl of said magnetic recording medium,
    the surface of said heating roller being covered with a material having thermal conductivity lower than that of a material forming the body of said heating roller.

2. An apparatus as recited in claim 1, wherein said material covering said surface has a thickness between 10 μm and 1 mm.

3. An apparatus as recited in claim 1, wherein said body of said heating roller comprises metal and said material covering said surface of said heating roller comprises polyethylene fluoride.

4. An apparatus as recited in claim 3, wherein said metal comprising said body of said heating roller is one of aluminum and stainless steel.

5. An apparatus as recited in claim 3, wherein the surface temperature of said heating roller is in the range approximating 180° C.

6. An apparatus as recited in claim 5, wherein each cross-sectional portion of said magnetic recording medium is in contact with the heating roller for a duration approximating 0.5 seconds.

7. An apparatus as recited in claim 3, wherein said heating roller has a temperature higher than a glass transition point of a flexible substrate of said magnetic recording medium.

8. An apparatus as recited in claim 1, wherein said material covering said surface of said heating roller is one of polyethylene fluoride, polyimide, alumina, silicon nitride and ceramic material.

9. An apparatus as recited in claim 1, wherein tension applied to said magnetic recording material is at least 1 kg(wt.) per width of 100 mm.

10. An apparatus as recited in claim 1, wherein said magnetic recording material is wound about said heating roller so that said magnetic recording material contacts said heating roller along 90°–350° of the circumference of said heating roller.

11. An apparatus as recited in claim 1, wherein said heating roller has an outer diameter of 100 mm to 2000 mm. and wherein said magnetic recording material contacts said heating roller along 90°–350° of the circumference of said heating roller.

* * * * *